P. A. REINHOLD.
TRACTOR AND PLOWING ATTACHMENT THEREFOR.
APPLICATION FILED MAY 21, 1920.

1,423,736.

Patented July 25, 1922.

Inventor
Philip A. Reinhold.
By Lancaster and Allwine
his Attorneys

P. A. REINHOLD.
TRACTOR AND PLOWING ATTACHMENT THEREFOR.
APPLICATION FILED MAY 21, 1920.
1,423,736.
Patented July 25, 1922.
4 SHEETS—SHEET 2.
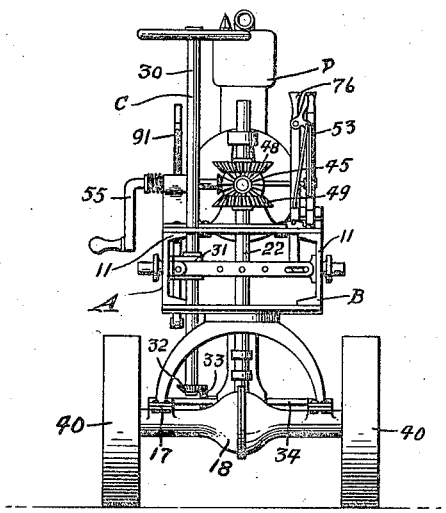
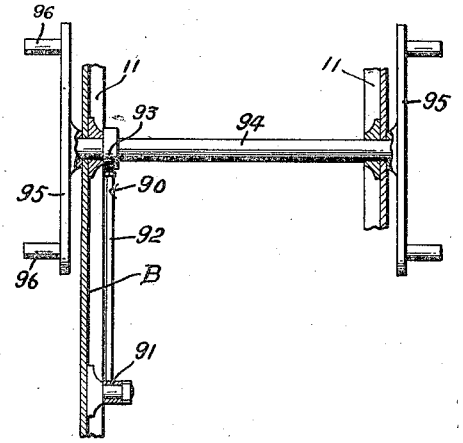
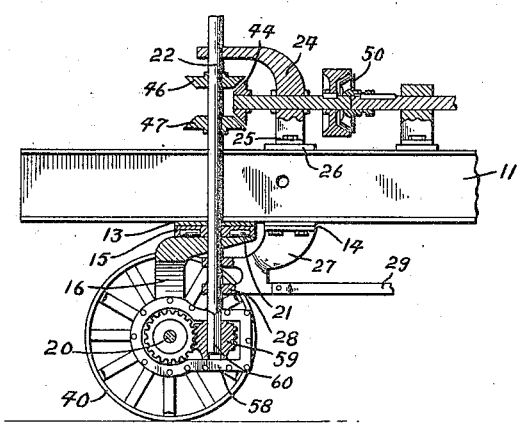
Inventor
Philip A. Reinhold.

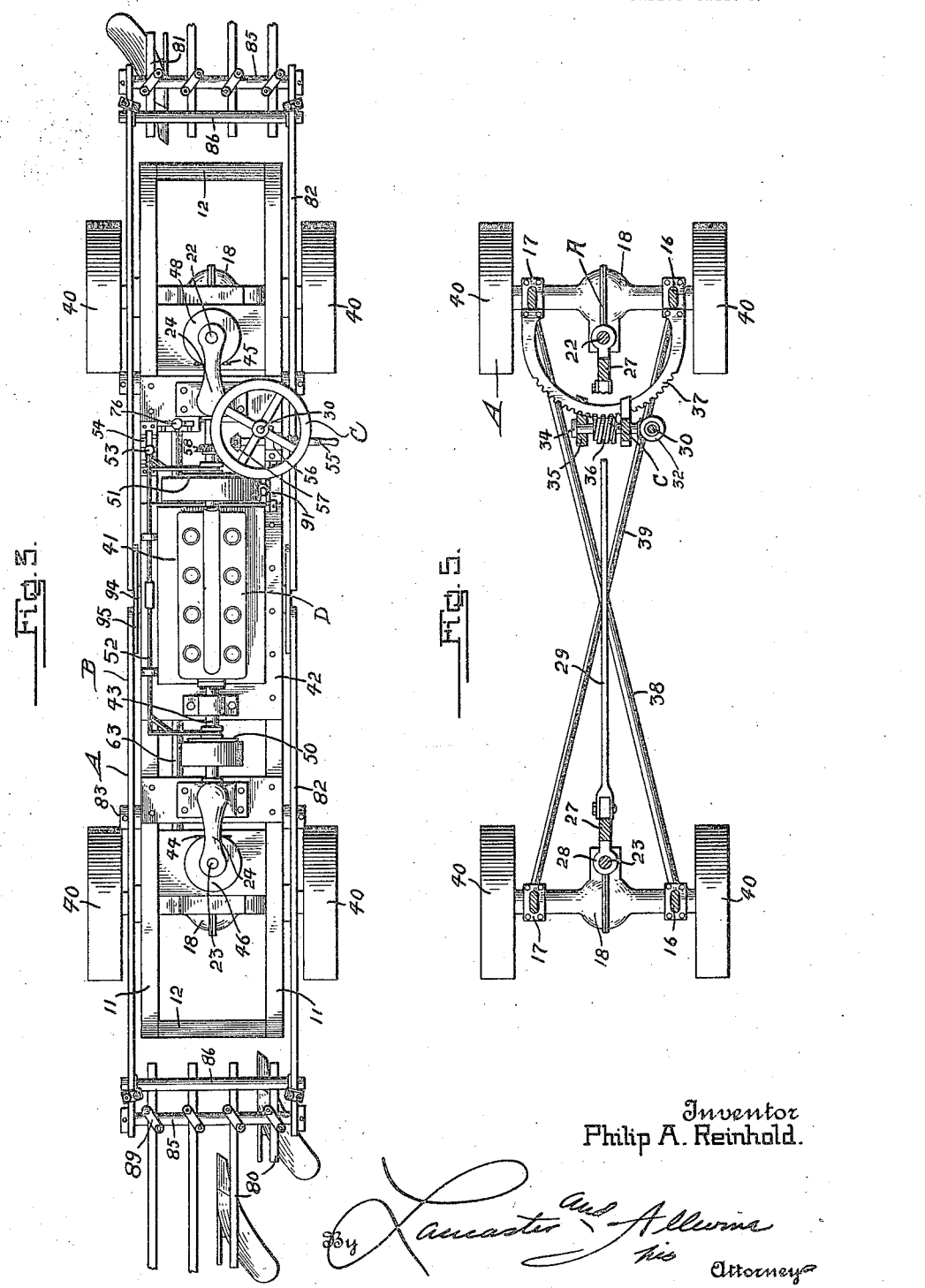

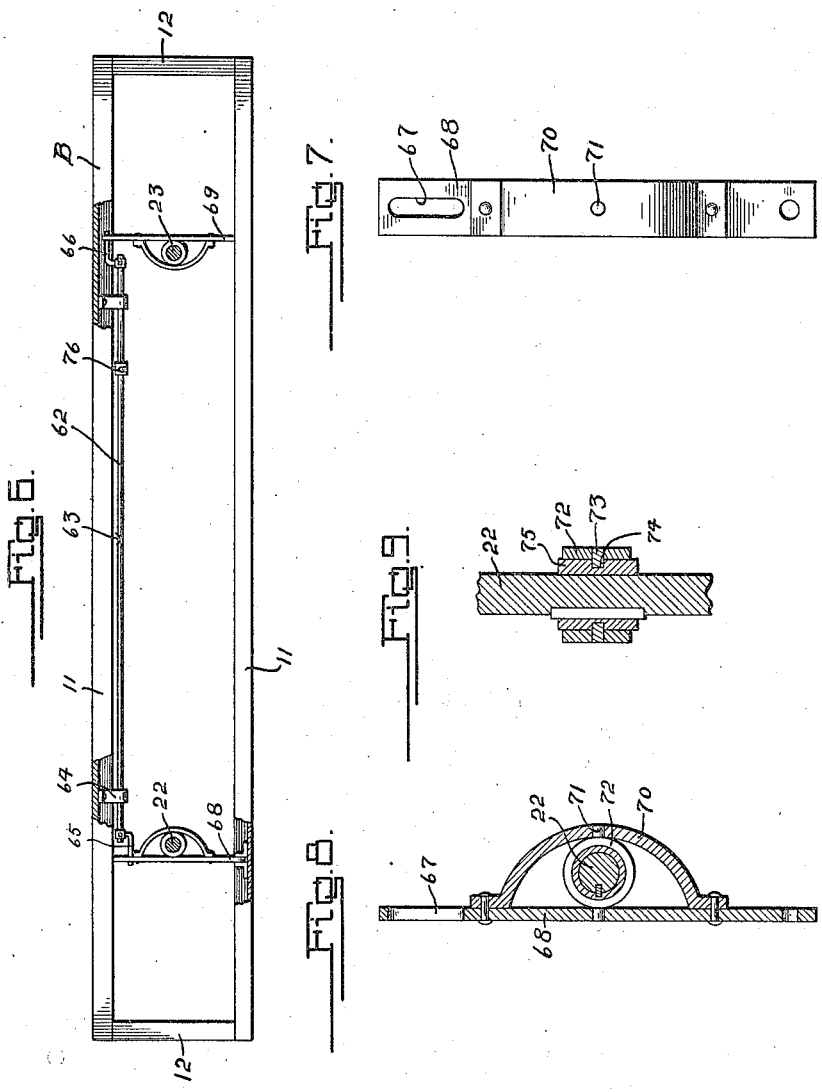

UNITED STATES PATENT OFFICE.

PHILIP ADAM REINHOLD, OF AKRON, OHIO.

TRACTOR AND PLOWING ATTACHMENT THEREFOR.

1,423,736.   Specification of Letters Patent.   Patented July 25, 1922.

Application filed May 21, 1920. Serial No. 383,223.

*To all whom it may concern:*

Be it known that I, PHILIP A. REINHOLD, a citizen of the United States, residing at Akron, in the county of Summit and State of Ohio, have invented certain new and useful Improvements in Tractors and Plowing Attachments Therefor, of which the following is a specification.

This invention relates to tractors, and the primary object of the invention is to provide an improved tractor for all farm purposes, which is well balanced, compact and easy to operate.

Another object of the invention is to provide an improved tractor having plow gangs arranged at the opposite ends thereof, which is adapted to be driven in either direction so that the necessity of turning completely around when the end of the furrow is reached is eliminated.

A further object of the invention is to provide an improved means for permitting a tractor to be driven and steered from all four wheels thereof so that the tractor will be permitted to make relatively short turns and thus permit the effective use thereof in plowing or the like in short corners.

A still further object of the invention is to provide an improved tractor of the above character which is durable and efficient in use, one that is simple and easy to manufacture, and one which can be placed upon the market at a comparatively small cost.

With these and other objects in view, the invention consists in the novel construction, arrangement and formation of parts as will be hereinafter more specifically described, claimed and illustrated in the accompanying drawings, forming a part of this specification, in which:

Figure 2 is a front elevation of the same.

Figure 3 is a top plan view of the improved tractor.

Figure 4 is a vertical fragmentary longitudinal section through the tractor illustrating the means for operatively connecting the counter shaft with the drive axle and drive shaft.

Figure 5 is a fragmentary horizontal section through the tractor illustrating the means for operatively connecting the front and rear axles together, so as to permit the same to turn vertically during the steering of the tractor.

Figure 6 is a detail plan view of the frame of the chassis, parts of the same being in section, the counter shaft for connecting the drive shaft and drive axle.

Figure 7 is an enlarged detail view of the lever for lifting said counter shaft.

Figure 8 is an enlarged horizontal section through the lever and counter shaft showing the means for operatively connecting the levers with the counter shafts.

Figure 9 is an enlarged fragmentary vertical section through the counter shaft and lever.

Figure 10 is an enlarged fragmentary horizontal section through the chassis frame illustrating the means carried thereby for raising and lowering the plow beam.

Referring to the drawings, in detail, wherein similar reference characters designate corresponding parts throughout the several views, the letter A generally indicates the improved tractor which includes the frame B, the steering mechanism C and the driving mechanism D.

Figure 1:
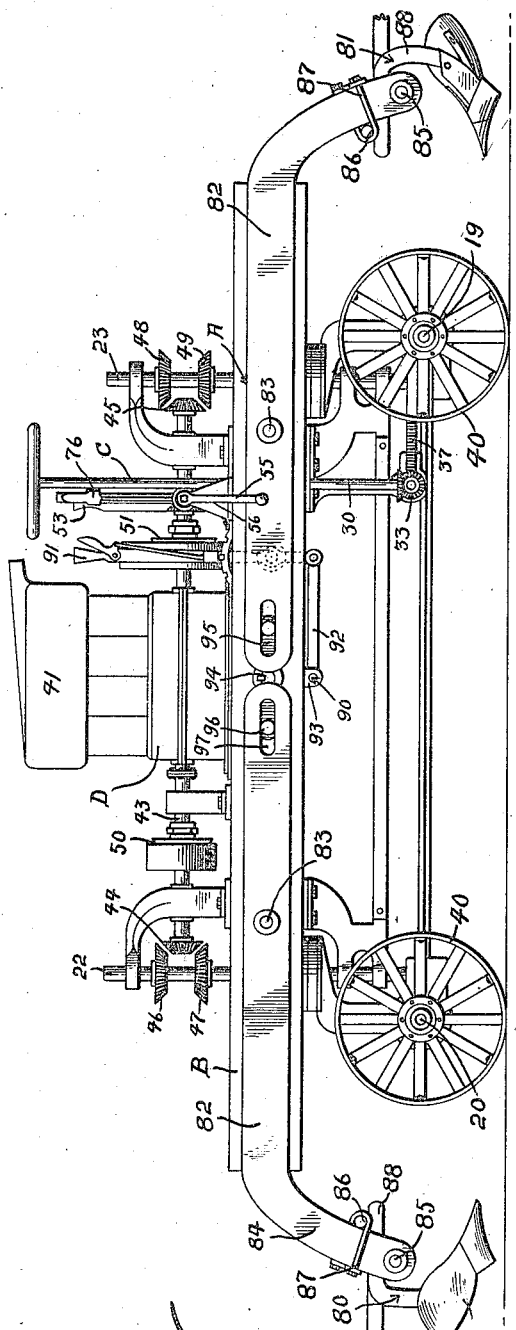
Figure 1 is a side elevation of the improved tractor.

The frame B includes a pair of spaced channel beams 11 and end plates 12. The frame may be braced throughout its length in any preferred manner and as shown the frame is provided with pairs of spaced plates 13 and 14, adjacent to each end thereof. These pairs of plates extend transversely across the frame and are secured to the lower surface of the side channel beams 11. The end plates 13 have secured to the central portion thereof the retaining caps 15 which form bearings for the substantially U-shaped inverted yokes 16, the lower ends of which are secured as at 17 to the axle housing 18 of the front and rear axles 19 and 20. The central portion of these yokes 16 are provided with circular bearing surfaces which fit in the bearing caps 15 and suitable roller bearings or the like 21 are interposed therein. This permits the free rotation of the yokes 16 on the frame. The vertical axes of the bearing caps are provided with openings which are adapted to slidably and rotatably receive the front and rear counter shafts 22 and 23. The upper terminals of these counter shafts are slidably and rotatably supported by upper brackets 24 which are bolted or otherwise secured as at 25 to the transversely extending plates 26 secured transversely of the frame to the upper surface of the side channel beams 11.

Depending brackets 27 are secured to the transversely extending plate 14 and the lower end of these brackets are provided with forwardly extending arms 28 which rotatably and slidably receive the counter shafts 22 and 23. The front and rear depending brackets 27 are connected together by a longitudinally extending reach pole or bar 29 which serves to add rigidity to the frame.

The steering mechanism C for the tractor A includes the steering post 30 which is rotatably mounted in suitable bearings 31 secured to one of the side channel beams 11. The lower end of the steering post C is provided with a bevelled gear 32 which meshes with a bevelled gear 33 keyed or otherwise secured to the transversely extending shaft 34 which is mounted in suitable bearing brackets 35 carried by the frame B. The transversely extending shaft 34 has keyed or otherwise secured thereto a worm 36 which meshes with a sector worm wheel 37 which is bolted or otherwise secured to the axle casing 18 at the forward end of the frame.

Thus it can be seen that when the steering post 30 is rotated, the front axle housing 18 will be swung in an arc. To permit of the rear axle 18 being turned therewith, diagonally extending connecting cross rods 38 and 39 are provided. These diagonally extending cross rods have their terminals pivotally connected to the front and rear axle housings adjacent to their terminals. Thus it can be seen that when the front axle housing is turned the rear axle housing will be turned therewith. These rods 38 and 39 may be dispensed with and the rear axle housing secured against movement to the frame. The front and rear axles 19 and 20 have secured thereto in any preferred manner the ground or supporting wheels 40.

The driving means D for the front axles 19 and 20 includes a prime mover 41 which as shown is an internal combustion engine of the four cylinder type, but it is to be understood that any other preferred type of prime mover may be substituted therefor without departing from the spirit or scope of this invention. The engine bed 42 is bolted or otherwise secured to the longitudinally extending side beams 11 at the direct center thereof which equally distributes the weight of the motor throughout the length of the frame. The crank shaft 43 of the engine is extended outwardly from the opposite ends thereof and the terminal of this shaft has keyed thereto suitable bevelled gears 44 and 45, which are adapted to mesh with bevelled gears 46, 47, 48 or 49 secured to the counter shafts 22 and 23. As clearly shown in the drawings, the pairs of gears 46 and 47 and 48 and 49 are keyed to the shafts 22 and 23 in spaced relation to each other and the bevelled gears 44 and 45 are adapted to be normally positioned intermediate the same and when it is desired to rotate the axles it is necessary to raise or lower the counter shafts 22 and 23 so as to bring the opposite gears of the pairs of gears into engagement with the bevelled gears 44 and 45. The drive or crank shaft 43 has interposed therein on opposite sides of the engine the clutches 50 and 51 and the sliding portion of the clutches are operatively connected to each other by means of the substantially U-shaped frame 52, which is provided with an operating lever 53 which is provided with a suitable dog and rack mechanism 54 for holding the clutches in any preferred adjusted position. The engine is provided with a transversely extending starting crank 55, which is mounted in suitable bearings 56 secured to one of the side bars and the inner end of this crank is provided with a bevelled gear 57 which is adapted to mesh with a bevelled gear 58 secured to the crank or drive shaft. Thus it can be seen that when it is desired to crank the shaft it is merely necessary to push the crank 55 into engagement with the bevelled gear 58 and turn the same in the usual manner.

The axle housings 18 are enlarged in the usual manner at their central portions to provide a housing for the differential gears and the housings in this instance are provided with inwardly extending enlargements 58 which support the worms 59 which are adapted to mesh with the differential gearing. These worms are provided with squared bores which are adapted to slidably receive the squared lower terminals of the counter shafts 22 and 23.

When the tractor is to be moved frowardly the counter shafts 22 and 23 are moved so that the bevelled gears 44 and 45 will mesh with the bevelled gears 48 and 47. When it is desired to have the tractor moved in a reverse direction the shafts 22 and 23 are moved in an opposite direction so as to bring the gear wheels 49 and 46 in meshing engagement with the gear wheels 44 and 45.

A means 62 is provided for operating the counter-shaft 22 and 23 simultaneously and this means is so arranged that when one counter shaft is moved up the other counter shaft will be moved down. This means 62 includes a longitudinally extending rod 63 which is mounted for rotation in suitable bearings 64 which are bolted or otherwise secured to one of the side channel beams 11. The terminals of the rod 63 is provided with opposite directed crank arms 65 and 66 and these crank arms are adapted to engage in slots 67 formed in the outer terminals of levers 68 and 69 which have their opposite ends pivotally secured to the opposite longitudinally extending side beam 11. Each of these levers 68 and 69 carries a substantially semi-circular yoke 70 and the shafts 22 and 23 are adapted to fit between the levers 68 and 69 and their yokes 70. Each of the levers 68 and 69 and their yokes 70 have connected thereto by diametrically opposed pins 71 collars 72 and these collars carry inwardly extending pins 73 which are slidably mounted in annular grooves 74 formed in collars or the like 75, which are keyed or otherwise secured to the counter shafts 22 and 23. The longitudinally extending rod 63 intermediate its ends has connected thereto an operating lever 76, which is provided with a suitable rack and dog mechanism so as to hold the lever in any adjusted position. It can be seen that when the lever is moved in one direction the cranks 65 and 66 will be moved in opposite directions so as cause the levers 68 and 69 to be moved up and down. This movement will be transmitted to the shafts 22 and 23 through the medium of the collars 72 and 75. Thus an effective means has been provided for simultaneously operating the shafts so as to permit the tractor to be moved in a forward or reverse direction or to remain in a neutral position. The stationary portions of the clutches 50 and 51 form pulleys whereby belts or the like may be connected to the engine so as to permit the use of the same for driving various farm machinery, such as pumps, mills, separators and the like.

In operation of the tractor, the lever 76 is shifted so as to move the counter-shafts 22 and 23 and bring the desired gears carried thereby in engagement with the gears 44 and 45. The tractor can be steered in the usual manner and owing to the balancing of the parts of the tractor the same can be easily and readily steered. The tractor can be used for any purpose and for drawing any preferred type of farm implement such as plows, elevators and the like. As shown the opposite end of the tractor frame carries right and left gangs of plows 80 and 81. These gangs of plows are carried by pairs of guide beams 82, which are secured intermediate their ends upon suitable pivot pins or the like 83 carried by the side beams 11 of the tractor. These beams extend inwardly and terminate at the central portion of the frame. The outer ends of the beams or bars are bent downwardly as at 84 and are connected by pairs of transversely extending side bars 85 and 86 which constitute the draw bars for the tractor. The bar 86 may be detachably connected to the lower angled terminals of the side bars or beams 82 if so desired and as shown several U-shaped clips or clevis are provided for holding the same in place. The plow beams 88 for the gangs of plows 80 are placed intermediate the beams 85 and 86 so as to engage the opposite faces thereof and the plow beams are preferably secured to the lower draw bar 85 by means of U-shaped clips 89. These clips permit the plow beam to swing thereon. Thus when a stone or other solid object is struck by one of the plows the same is free to move upwardly under the influence thereof and thereby prevent the breaking of the plow points. The gangs of plow beams 80 and 81 are provided so that the necessity of turning the tractor around at the end of the furrows will be prevented and it is merely necessary to raise one plow gang and lower the other plow gang when the end of the furrow is reached. This is permitted owing to the fact that all four wheels of the tractor are dirigible and the same are turned at an angle to the frame so as to allow the frame to be moved transversely.

A means 90 has been provided for simultaneously operating the gangs of plows 80 and 81 so that when one is lifted the other gang will be lowered. This means 90 includes an operating lever 91 which is mounted intermediate its ends upon one of the side beams 11. The lower end of the lever is connected by means of a link 92 to a crank 93, which is secured to a centrally disposed transversely extending shaft 94. The opposite ends of the shafts 94 are provided with outwardly extending arms 95, which carry pins 96 which engage in slots 97 formed in the inner ends of the bars or beams 82. Thus it can be seen that when the lever 91 is shifted the shaft 94 will be rotated, which will move the arms and thus cause one end of the same to be raised and the other end lowered which will raise the inner ends of one set of the side bars or beams and raise the inner ends of the other set of side bars or beams.

It is to be understood that the gangs of plow beams 80 and 81 can be removed and other agricultural implements substituted therefor.

Inasmuch as the tractor is equally balanced, the necessity of providing wheels having relatively wide rims is eliminated and this permits the tractor to be effectively used for cultivation purposes.

From the foregoing description it can be seen that an improved tractor has been provided which is of exceptionally simple and compact nature and which can be readily operated to the best of advantage for farm purposes.

Changes in details may be made without departing from the spirit or scope of this invention; but,

I claim:

1. A tractor comprising a longitudinally extending frame, axle, housings carried by the frame adjacent to the terminals thereof, and arranged for swinging movement, drive axles rotatably mounted in said housings, vertically disposed rotatable and slidable counter shafts carried by the frame and arranged on opposite sides of the power plant, means operatively connecting the lower terminal of the counter shaft with the drive axle, bevelled gear wheels carried by the terminals of the drive shaft of the power plant, pairs of spaced bevelled gear wheels carried by the counter shaft, and means for simultaneously raising and lowering said counter shaft for bringing one of the pairs of gear wheels on said counter shaft in engagement with the bevelled gears on said drive shaft of the power plant.

2. A tractor comprising a longitudinally extending frame, front and rear axle housings carried by the frame adjacent to the terminals thereof for swinging movement, drive axles rotatably mounted in said housing, means for simultaneously swinging said axle housings, rotatable and slidable vertically disposed counter shafts carried by the frame and arranged on opposite sides of the transverse center thereof, a motor carried by the frame and arranged centrally thereof and including an outwardly extending drive shaft, clutches interposed in the drive shaft, bevelled gear wheels carried by the terminals of the drive shaft, oppositely disposed pairs of spaced gear wheels keyed to said counter shafts, the pairs of bevelled gears being arranged in spaced relation to each other and located on the opposite sides of the bevelled gear carried by the terminals of the drive shaft and means for simultaneously raising and lowering said counter shaft for bringing one bevelled gear thereof of each pair of bevelled gears in engagement with the bevelled gears carried by the drive shaft.

3. A tractor comprising a frame, a centrally disposed power plant having drive shafts extending outwardly from the opposite sides thereof, bevelled gears keyed to the terminals of the shaft, clutches interposed in the shaft on opposite sides of the plant, bearings carried by the opposite ends of the frame, inverted U-shaped yokes rotatably carried by the bearings, axles housings carried by the yokes, drive axles rotatably mounted in said housings, drive wheels secured to said drive shaft, vertically disposed counter shafts arranged at the central axis of the bearings, rotatable worm wheels carried by the axle housings, means operatively connecting the worm wheels with the drive shaft, means slidably and rotatably connecting the counter shaft with the worm wheels, pairs of bevelled gears keyed to the counter shaft, the bevelled gears being arranged at opposite sides of the bevelled gears carried by the terminals of the drive shaft, a rotatable rod arranged longitudinally of the frame, oppositely directed cranks secured to the terminals of the rod, a lever for operating said rod, a pair of levers pivotally secured to the frame, means operatively connecting the cranks with the free ends of the levers, and means connecting said levers with said countershaft whereby upon movement of said lever the counter shafts will be slid in opposite direction.

4. In a tractor, a longitudinally extending frame, a power plant carried by the central portion of the frame having its drive shaft extending outwardly from the opposite ends thereof, bevelled gears keyed to the terminals of the shaft, depending bearings carried by the frame adjacent to the opposite ends thereof, yokes rotatably carried by the bearings, axle housings secured to the yokes, drive axles rotatably mounted in said housings, vertically disposed counter shafts rotatably and slidably carried by the same, and disposed at the vertical axis of the bearing, means operatively connecting the lower terminals of the counter shaft with the drive axles, spaced bevelled gears carried by each one of the counter shafts, said bevelled gears being arranged above and below the bevelled gears keyed to said drive shaft, means for simultaneously sliding the counter shaft in opposite directions, an arcuate worm wheel secured to one of said axle housings, a steering post, a transversely extending shaft, means operatively connecting the steering post with the transversely extending shaft, a worm keyed to said transversely extending shaft and meshing with said tractor worm wheel, and diagonally extending cross rods pivotally connected to said axle housings.

PHILIP ADAM REINHOLD.